United States Patent Office 3,278,618
Patented Oct. 11, 1966

3,278,618
PROCESS FOR THE PRODUCTION OF CYCLO-
HEXENE AND METHYLCYCLOHEXENE
Masataka Amagasa and Tadashi Yamaguchi, Sendai-shi,
Japan, assignors to Chiyoda Kako Kensetsu Kabushiki
Kaisha (known as Chiyoda Chemical Engineering and
Construction Co.), Tokyo-to, Japan, a joint-stock company of Japan
No Drawing. Filed July 23, 1963, Ser. No. 296,926
Claims priority, application Japan, July 28, 1962,
37/31,928, 37/31,930, 37/31,931
18 Claims. (Cl. 260—666)

The present invention relates to a process for the hydrogenation and isomerization of dihydrobenzene or dihydrotoluene, particularly to a process for production of a substance which is represented by the structural formula, viz.

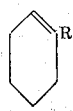

(Here, R is hydrogen or methyl group), from a substance which is represented by the structural formula viz.

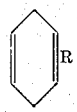

(Here, R is hydrogen or methyl group), by use of at least one substance selected from the group consisting of alkali metal amides, alkaline earth metal amides, alkali metals and alkaline earth metals in liquid ammonia in the presence or absence of a proton donor.

Hereinafter,

is called as cyclohexene,

as methylcyclohexene, and

is called as dihydrobenzene,

as dihydrotoluene.
Dihydrotoluene

symbolizes

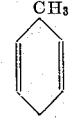

and

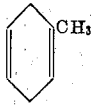

The present inventors have studied on organic chemistry utilizing liquid ammonia and its applications, and the present invention is one part of their studies.
Dihydrobenzene, 1.4-dihydrobenzene

and 1.2-dihydrobenzene

are generally known. As the result of researches, the present inventors have found that when an alkali metal amide or alkaline earth metal amide is reacted with the above-mentioned dihydrobenzene is liquid ammonia, cyclohexene

and benzene

of an amount which is almost equivalent to that of the cyclohexene are obtained in accordance with the following reaction mechanism.

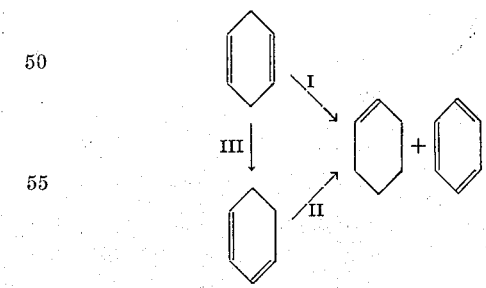

(I) Disproportionation reaction
(II) Disproportionation reaction
(III) Isomerization reaction In this case, it is presumed that in the reaction (III) 1.4-dihydrobenzene

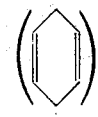

is converted to 1.2-dihydrobenzene

by isomerization and thereafter generates cyclohexene

and benzene

by disproportionation reaction. In such case, the above-mentioned amides catalytically act in the reactions (I), (II), and (III), and therefore the amount of amides has no relation to the amount of dihydrobenzene. Only a small amount of them can attain the object.

When dihydrobenzene is reacted with an alkali metal or alkaline earth metal in liquid ammonia, cyclohexene and benzene are produced. However, the amount of the cyclohexene is more than that equivalent to benzene. The principal reactions are presumed to correspond to the following reaction mechanism.

(III) Isomerization reaction
(IV) Disproportionation reaction
(V) Disproportionation reaction and partial reduction In this case also, the above-mentioned metals act catalytically in the reactions (III), (IV) and (V) as shown in the above reaction mechanism, so that even when the amount of the said metals is very minor the object is attained. When the amount of the used metal is increased, a partial reduction is carried out and the yield of the cyclohexene is increased. However, it is unnecessary to use the said metal more than two equivalents to dihydrobenzene.

When an alkali metal or alkaline earth metal is reacted with the dihydrobenzene in liquid ammonia in the presence of a proton donor, only the cyclohexene

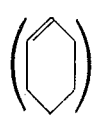

can be produced in accordance with the following reaction mechanism.

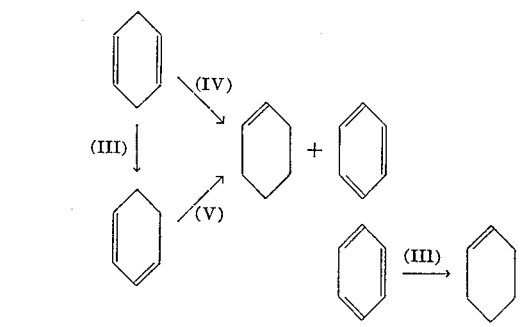

(III) Isomerization
(IV) Disproportionation
(V) Disproportionation and reduction Reaction (VI) indicates that the by-product benzene may be recycled to be reacted to produce additional cyclohexene.

That is to say, when two more equivalents or of an alkali metal or alkaline earth metal to dihydrobenzene and two equivalents of a proton donor to dihydrobenzene are used, only the cyclohexene is obtained and benzene is not produced. In this case, the reaction temperature is not particularly limited.

It is known that there are five kinds of isomers in regard to dihydrotoluene and three kinds of isomers are present with regard to methylcyclohexene

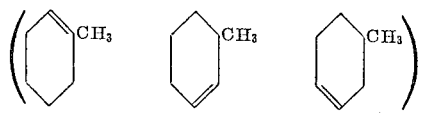

As the result of study the present inventors have found that when the dihydrotoluene isomers are reacted with a reducing agent in liquid ammonia in the presence of such a decomposing agent mentioned above, the amount of said reducing agent being more than equivalent to the amount of the decomposing agent, disproportionation and isomerization occur at one time whereby methylcyclohexene is produced. In the case where the reduction reaction is carried out incompletely, toluene rather than methylcyclohexene is formed.

The reaction temperature is not limited. However, in case of a high temperature a part of liquid ammonia arts as a decosposing agent even in the absence of a decomposing agent, thereby to yield methylcyclohexene.

As the result of study, the present inventors have found that by reacting dihydrotoluene with alkali metal amide or alkaline earth metal amide in liquid ammonia 1-methylcyclohexene-(1)

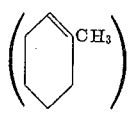

and almost equivalent toluene may be formed finally by means of disproportionation and isomerization.

In this case, these amides act as catalysts in disproportionation and isomerization. Therefore, the amount of said amides employed has no relation with the amount of dihydrotoluene and only a small amount of them can attain the object. The reaction temperature is not particularly limited.

As the alkali metals, lithium, sodium and potassium and as the alkaline earth metals calcium, strontium and barium may be used, respectively. In view of solubility and practicality sodium is most excellent. As the alkali metal amides, lithium amide, sodium amide and potassium amide, and as the alkaline earth metal amides, calcium amide, strontium amide and barium amide may be used, respectively. However, in view of solubility potassium amide and in view of practicality sodium amide are most excellent. As the proton donors, water, alcohol and so-called ammono acids may be used. Any one of the substances which become proton donors in liquid ammonia can be used, but from the commercial point of view water is most advantageous.

The nature and characteristic features of the present invention will be apparent from the description in connection with the following examples of the present invention.

Example 1

Into a 40 cc. pressure-resisting glass reaction tube, 10 cc. of liquid ammonia, 0.2 g. of metallic potassium and a small amount of iron nitrate (catalyst for amidation) where placed to convert completely the metallic potassium into potassium amide. Then, another pressure-resisting glass reaction tube filled with a solution comprising 3 g. of 1.4-dihydrobenzene and 10 cc. of liquid ammonia was connected with the said reaction tube, thereby a 1.4-dihydrobenzene-liquid ammonia solution was fed into said reaction tube. The mixture in said reaction tube is left standing at a normal temperature for several minutes, then the liquid ammonia solution assumed a red color. After leaving it at a room temperature for about one hour, ammonia was discharged. 20 cc. of water was gradually added into the residue, whereby an oil layer was produced. This oil layer was separated and analyzed by means of a gas chromatography, whereby 1.4 g. of cyclohexene and 1.4 g. of benzene were obtained.

Example 2

10 cc. of liquid ammonia, 3 g. of 1.4-dihydrobenzene, and 1.2 g. of metallic sodium were placed into a pressure-resisting glass reaction tube. The mixture in the reaction tube was reacted at —5° C. for 8 hours. After discharging the liquid ammonia by evaporation, 20 cc. of water was gradually added to separate an oil layer. By analyzing the said oil layer by means of a gas-chromatography, it was observed that 20 g. of cyclohexene and 0.9 g. of benzene were obtained.

Example 3

Into a pressure-resisting reaction tube 10 cc. of liquid ammonia, 3 g. of 1.2-dihydrobenzene and 1.2 g. of metallic sodium were placed. This mixture in the said reaction tube was reacted at 0° C. for 6 hours. After the completion of the reaction, the same treatment as in the case of the Example 2 was carried out. 2.2 g. of cyclohexene and 0.7 g. of benzene were obtained.

Example 4

10 cc. of liquid ammonia, 3 g. of 1.4-dihydrobenzene, and 1.5 of water were placed into a pressure-resisting glass reaction tube (A). Then, another pressure-resisting glass reaction tube (B) filled with a solution comprising 2.1 g. of metallic sodium and 10 cc. of liquid ammonia was connected to said reaction tube (A). At 15° C. the metallic sodium-liquid ammonia solution was gradually introduced from (B) to (A). After the completion of said introduction, the mixture was left standing at —15° C. for 6 hours, whereby the reaction was completed. After discharging ammonia, the same treatment as in the case of the Example 1 was carried out. 2.8 g. of cyclohexene alone was obtained.

Example 5

A 500 cc. cylindrical vessel of pressure resistance equipped with a stirrer, which is provided with a valve for exhaust of gas and feeding liquid (A) and a device for pressing alkali metals in (B) at the upper portion of the vessel and a liquid discharge valve (C) at the lower portion of the vessel was employed. 200 cc. of liquid ammonia, 10 g. of 2.5-dihydrotoluene

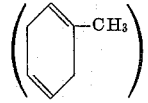

and 4 g. of water were placed in said vessel and gradually added with 6 g. of metallic sodium at 0° C. under a pressure with stirring from the device (B). After pressing metallic sodium in said vessel, the mixture was heated at 40° C. and stood for 4 hours. Then, ammonia was recovered from the valve (A). 200 cc. of water was gradually added into the residue in the vessel and thereafter removed from the exhaust-valve (C). The resulting liquid was divided into two liquid layers, and therefore an oil layer can be easily separated from the other. 9.5 g. of the oil layer was obtained. By the analysis of the layer by means of gas chromatography, 8 g. of 1-methylcyclohexene-(1)

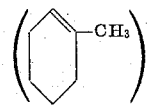

and 1.5 g. of toluene were obtained.

Example 6

200 cc. of liquid ammonia, 10 g. of 1.4-dihydrotoluene

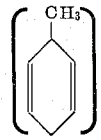

and 14 g. of ethyl alcohol were placed in the same pressure-resisting reaction vessel as employed in Example 1. 13.5 g. of potassium was pressed into the vessel at 10° C. under stirring in the same manner as in Example 1. After introducing potassium into the vessel the mixture was heated at 40° C. and stood for 8 hours. Then, by the same treatments as in Example 1 8.5 g. of 1-methylcyclohexene-(1)

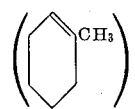

and 1.1 g. of 1-methylcyclohexene-(3)

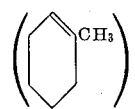

were obtained.

Example 7

10 cc. of liquid ammonia, 0.2 g. of metallic sodium and a small amount of iron nitrate (a catalyst for amidation) were placed in a pressure-resisting glass reaction tube. The metallic sodium was completely converted into sodium amide. Then, another pressure-resisting glass reaction tube filled with a solution containing 2 g. of 2.5-dihydrotoluene and 10 cc. of liquid ammonia was connected to said reaction tube, thereby to feed a 2.5-dihydrotoluene-liquid ammonia solution. By standing it at a normal temperature for a stort time, the liquid ammonia solution was turned to red. After standing alone at a room temperature for about 6 hours, ammonia was discharged and recovered. 20 cc. of water was gradually added into the residue. The oil layer was separated and analyzed by means of a gaschromatography. As the result 0.92 g. of 1-methylcyclohexene-(1)

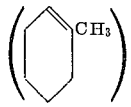

and 0.93 g. of toluene were obtained.

*Example 8*

10 cc. of liquid ammonia, 0.2 g. of metallic potassium and a small amount of iron nitrate were placed in a pressure-resisting glass reaction tube, to convert completely the metallic amide into potassium amide. Then, another pressure-resisting reaction tube filled with a solution comprising 2.0 g. of 3,4-dihydrotoluene and 10 cc. of liquid ammonia was connected to said reaction tube. The 3,4-dihydrotoluene-liquid ammonia solution was fed thereinto. The solution was turned to red as in Example 1. After maintaining it at 50° C. for about 3 hours, ammonia was discharged and recovered. 20 cc. of water was gradually added into the residue. The oil layer was separated and analyzed by means of gaschromatography. As the result, 0.9 g. of 1-methylcyclohexene-(1) and 0.9 g. of toluene were obtained.

As mentioned above, the present invention relates to a process for producing easily and selectively cyclohexene or methylcyclohexene from dihydrobenzene or dihydrotoluene, respectively, by utilizing peculiarities of liquid ammonia. The present invention effectively contributes to the petroleum chemical industry utilizing cyclohexene and methylcyclotoluene, and therefore it will be observed that the present invention is a very useful invention.

What is claimed is:

1. A process for the production of cyclohexene which consists essentially of: admixing liquid ammonia, a substance selected from the group consisting of alkali metals, alkaline earth metals, alkali metal amides, and alkaline earth metal amides, and dihydrobenzene, to form a mixture; and reacting the mixture.

2. A process for the production of methylcyclohexene which consists essentially of: admixing liquid ammonia, a substance selected from the group consisting of alkali metals, alkaline earth metals, alkali metal amides, and alkaline earth metal amides, and dihydrotoluene, to form a mixture; and reacting the mixture.

3. A process for the production of cyclohexene which consists essentially of: adding to liquid ammonia a substance selected from the group consisting of alkali metals, alkaline earth metals, alkali metal amides and alkaline earth metal amides and a substance selected from the group consisting of dihydrobenzene and a liquid ammonia solution of dihydrobenzene, to form a mixture; and reacting the mixture.

4. A process for the production of methylcyclohexene which consists essentially of: adding to liquid ammonia a substance selected from the group consisting of alkali metals, alkaline earth metals, alkali metal amides and alkaline earth metal amides and a substance selected from the group consisting of dihydrotoluene and a liquid ammonia solution of dihydrotoluene, to form a mixture; and reacting the mixture.

5. A process for the production of cyclohexene which consists essentially of: adding to a substance selected from the group consisting of dihydrobenzene and a liquid ammonia solution of dihydrobenzene a liquid ammonia mixture of a substance selected from the group consisting of alkali metals, alkaline earth metals, alkali metal amides and alkaline earth metal amides, to form a mixture; and reacting the mixture.

6. A process for the production of methylcyclohexene which consists essentially of: adding to a substance selected from the group consisting of dihydrotoluene and a liquid ammonia solution of dihydrotoluene a liquid ammonia mixture of a substance selected from the group consisting of alkali metals, alkaline earth metals, alkali metal amides and alkaline earth metal amides, to form a mixture; and reacting the mixture.

7. A process for the production of cyclohexene which consists essentially of: admixing liquid ammonia, a substance selected from the group consisting of alkali metals and alkaline earth metals, dihydrobenzene, and a less than equivalent amount of a proton donor with respect to said alkali metals and alkaline earth metals, to form a mixture; and reacting the mixture.

8. A process for the production of methylcyclohexene which consists essentially of: admixing liquid ammonia, a substance selected from the group consisting of alkali metals and alkaline earth metals, dihydrotoluene, and a less than equivalent amount of a proton donor with respect to said alkali metals and alkaline earth metals, to form a mixture; and reacting the mixture.

9. A process for the production of cyclohexene which consists essentially of: adding to liquid ammonia a substance selected from the group consisting of alkali metals and alkaline earth metals, a substance selected from the group consisting of dihydrobenzene and a liquid ammonia solution of dihydrobenzene, and a less than equivalent amount of a proton donor with respect to said alkali metals and alkaline earth metals, to form a mixture; and reacting the mixture.

10. A process for the production of methylcyclohexene which consists essentially of: adding to liquid ammonia a substance selected from the group consisting of alkali metals and alkaline earth metals, a substance selected from the group consisting of dihydrotoluene and a liquid ammonia solution of dihydrotoluene, and a less than equivalent amount of a proton donor with respect to said alkali metals and alkaline earth metals, to form a mixture; and reacting the mixture.

11. A process for the production of cyclohexene which consists essentially of: adding to a substance selected from the group consisting of dihydrobenzene and a liquid ammonia solution of dihydrobenzene a liquid ammonia solution of a substance selected from the group consisting of alkali metals and alkaline earth metals, and a less than equivalent amount of a proton donor with respect to said alkali metals and alkaline earth metals; and reacting the mixture.

12. A process for the production of methylcyclohexene which consists essentially of: adding to a substance selected from the group consisting of dihydrotoluene and a liquid ammonia solution of dihydrotoluene a liquid ammonia solution of a substance selected from the group consisting of alkali metals and alkaline earth metals, and a less than equivalent amount of a proton donor with respect to said alkali metals and alkaline earth metals; and reacting the mixture.

13. A process according to claim 7, wherein the proton donor is selected from the group consisting of water, alcohols, and ammono acids.

14. A process according to claim 8, wherein the proton donor is selected from the group consisting of water, alcohols, and ammono acids.

15. A process according to claim 9, wherein the proton donor is selected from the group consisting of water, alcohols, and ammono acids.

16. A process according to claim 10, wherein the proton donor is selected from the group consisting of water, alcohols, and ammono acids.

17. A process according to claim 11, wherein the proton donor is selected from the group consisting of water, alcohols, and ammono acids.

18. A process according to claim 12, wherein the proton donor is selected from the group consisting of water, alcohols, and ammono acids.

(References on following page)

References Cited by the Examiner

UNITED STATES PATENTS

| | | | |
|---|---|---|---|
| 2,182,242 | 12/1939 | Wooster | 260—667 |
| 2,316,136 | 4/1943 | Turnbull | 260—666 |
| 2,432,843 | 12/1947 | Whitman | 260—666 |

OTHER REFERENCES

A. P. Krapcho et al.: J. Am. Chem. Soc. 81, pp. 3658–3666, July 20, 1959.

DELBERT E. GANTZ, *Primary Examiner.*

V. O'KEEFE, *Assistant Examiner.*